US009465646B2

(12) United States Patent
Otomo et al.

(10) Patent No.: US 9,465,646 B2

(45) Date of Patent: Oct. 11, 2016

(54) DETECTION APPARATUS, NOTIFICATION METHOD, AND COMPUTER PRODUCT

(71) Applicant: FUJITSU LIMITED, Kawasaki-shi, Kanagawa (JP)

(72) Inventors: Toshiya Otomo, Kawasaki (JP); Koichiro Yamashita, Hachioji (JP); Takahisa Suzuki, Yokohama (JP); Hiromasa Yamauchi, Usakos (NA); Yuta Teranishi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 28 days.

(21) Appl. No.: 14/477,667

(22) Filed: Sep. 4, 2014

(65) Prior Publication Data

US 2014/0380333 A1 Dec. 25, 2014

Related U.S. Application Data

(63) Continuation of application No. PCT/JP2012/057064, filed on Mar. 19, 2012.

(51) Int. Cl.
*G06F 9/46* (2006.01)
*G06F 9/48* (2006.01)

(52) U.S. Cl.
CPC ............... *G06F 9/46* (2013.01); *G06F 9/4887* (2013.01); *Y02B 60/144* (2013.01)

(58) Field of Classification Search
CPC ...... G06F 9/46; G06F 9/4887; Y02B 60/144
See application file for complete search history.

(56) References Cited

U.S. PATENT DOCUMENTS

| | | | | |
|---|---|---|---|---|
| 8,627,319 B1 * | 1/2014 | Xu | G06F 9/4887 718/100 |
| 2005/0005273 A1 * | 1/2005 | Jones | G06F 9/4887 718/108 |
| 2008/0028411 A1 * | 1/2008 | Cherkasova | G06F 9/5027 718/104 |

(Continued)

FOREIGN PATENT DOCUMENTS

| | | |
|---|---|---|
| JP | 63-223860 A | 9/1988 |
| JP | 08-202409 A | 8/1996 |
| JP | 2002-049405 A | 2/2002 |

(Continued)

OTHER PUBLICATIONS

"Kernel Kara Miru Saishin UNIX: OpenBSD," UNIX Magazine, Jul. 1, 2008, vol. 23, No. 3 (whole No. 243), p. 77.

(Continued)

*Primary Examiner* — Charles E Anya
(74) *Attorney, Agent, or Firm* — Arent Fox LLP

(57) ABSTRACT

A coprocessor stores to local memory, a driver execution start time, for each execution start of drivers. If a CPU call process is executed during the execution of driver A, the coprocessor calculates the difference of the execution start time and the current time, for drivers B and C. Taking driver C as an example, the coprocessor adds to the difference calculated for the driver C, a processing time required for the CPU call process of driver A and a processing time required for a normal process of driver B. The coprocessor determines whether respective addition results for driver C comply with respective time constraints. If it is determined that an addition result for the driver C cannot comply with the time constraint, and the coprocessor sends an execution request for driver C to another coprocessor.

6 Claims, 13 Drawing Sheets

START
S1201
EXECUTION REQUEST OR EXECUTION INSTRUCTION RECEIVED?
NO
EXECUTION INSTRUCTION
EXECUTION REQUEST
S1202
CALCULATE TOTAL PROCESSING TIME REQUIRED FOR NORMAL PROCESS OF DRIVER DEFINED AS OBJECT OF EXECUTION REQUEST AND PROCESSING TIMES REQUIRED FOR NORMAL PROCESSES OF ASSIGNED DRIVERS
S1203
TIME CONSTRAIN COMPLIED WITH?
NO
YES
S1204
NOTIFY EXECUTION REQUEST NOTIFICATION SOURCE OF IMPOSSIBILITY OF EXECUTION
S1205
NOTIFY EXECUTION REQUEST NOTIFICATION SOURCE OF EXECUTION ACCEPTANCE
S1206
REGISTER INTO DISPATCH LOOP, DRIVER DEFINED AS OBJECT OF EXECUTION INSTRUCTION

(56) References Cited

U.S. PATENT DOCUMENTS

2010/0268912 A1* 10/2010 Conte .................. G06F 9/4856 712/20
2013/0138849 A1 5/2013 Yamashita et al.

FOREIGN PATENT DOCUMENTS

JP 2002-342098 A 11/2002
JP 2008-140191 A 6/2008
JP 2011-141782 A 7/2011
WO WO 2012/014312 A1 2/2012

OTHER PUBLICATIONS

International Search Report, Japanese Patent Application No. PCT/JP2012/057064 dated Apr. 17, 2012.

* cited by examiner

<POLLING-TYPE SENSOR>

<INTERRUPT-TYPE SENSOR>

COPROCESSOR 101-1
COPROCESSOR 101-2
A
B
C
A
B
C
A
A'
B
C
D
E
D
E
D
E
EXECUTION REQUEST FOR DRIVER C
PROCESSING TIME A t2a FOR CPU CALL PROCESS OF DRIVER
PROCESSING TIME B t1b FOR NORMAL PROCESS OF DRIVER
EXECUTION START TIME OF DRIVER B: tsb
EXECUTION START TIME OF DRIVER C: tsc
EXECUTION START TIME OF DRIVER A: tsa
teb
tec
TIME CONSTRAINT tpb≥teb?
TIME CONSTRAINT tpc≥tec?
TIME COPROCESSOR 101-1
COPROCESSOR 101-2
A
B
C
A
B
C
A
A'
D
E
D
E
D
E
C
D
E
EXECUTION START TIME OF DRIVER C: tsc
EXECUTION START TIME OF DRIVER D: tsd
EXECUTION START TIME OF DRIVER E: tse
PROCESSING TIME t1e FOR NORMAL PROCESS OF DRIVER E
PROCESSING TIME t1c FOR NORMAL PROCESS OF DRIVER C
PROCESSING TIME t1d FOR NORMAL PROCESS OF DRIVER D
total
TIME CONSTRAINTS tpc, tpd, tpe≥total?
TIME

| DRIVER ID | FIRST PROCESS-ING TIME | SECOND PROCESS-ING TIME | TIME CONSTRAINT | EXECUTION START TIME | |
|---|---|---|---|---|---|
| A | t1a | t2a | tpa | tsa | 701-1 |
| B | t1b | t2b | tpb | tsb | 701-2 |
| C | t1c | t2c | tpc | tsc | 701-3 |

700-2

| DRIVER ID | FIRST PROCESS-ING TIME | SECOND PROCESS-ING TIME | TIME CONSTRAINT | EXECUTION START TIME | |
|---|---|---|---|---|---|
| D | t1d | t2d | tpd | tsd | 702-1 |
| E | t1e | t2e | tpe | tse | 702-2 |

START
S1001
INITIALIZE
S1002
SEQUENTIALLY SELECT DRIVER FROM DISPATCH LOOP
S1003
ACQUIRE CURRENT TIME FROM TIMER
S1004
CORRELATE AND OUTPUT TO LOCAL MEMORY, ACQUIRED CURRENT TIME AND SELECTED DRIVER
S1005
EXECUTE SELECTED DRIVER
A
S1006
CPU CALL PROCESS TO BE EXECUTED?
NO
YES
S1007
HAS EXECUTION OF SELECTED DRIVER ENDED?
NO
YES
S1008
REGISTER SELECTED DRIVER AT END OF DISPATCH LOOP
B

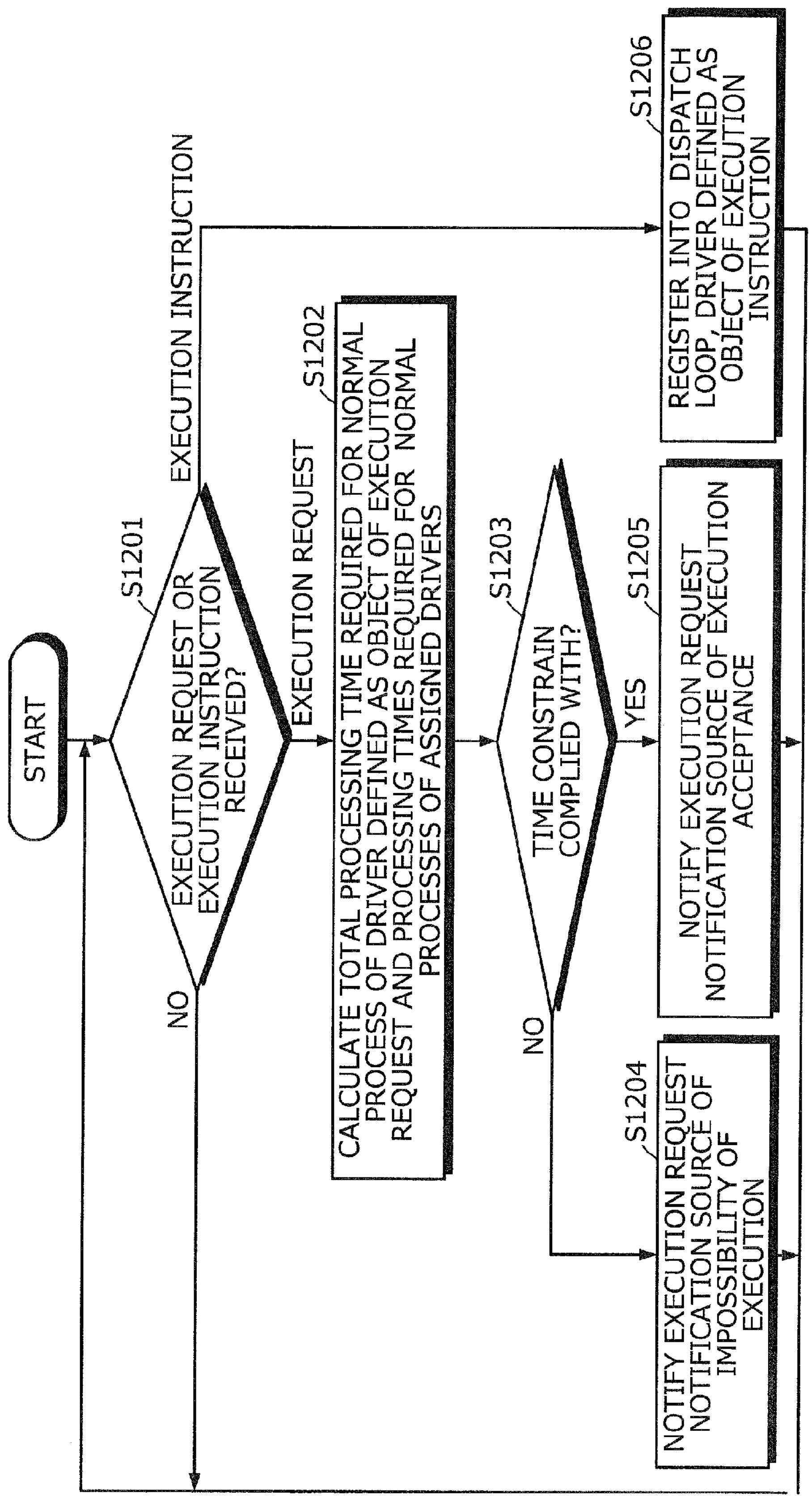
FIG.12
START
EXECUTION REQUEST OR EXECUTION INSTRUCTION RECEIVED?
S1201
NO
EXECUTION REQUEST
EXECUTION INSTRUCTION
S1202
CALCULATE TOTAL PROCESSING TIME REQUIRED FOR NORMAL PROCESS OF DRIVER DEFINED AS OBJECT OF EXECUTION REQUEST AND PROCESSING TIMES REQUIRED FOR NORMAL PROCESSES OF ASSIGNED DRIVERS
S1203
TIME CONSTRAIN COMPLIED WITH?
YES
NO
S1204
NOTIFY EXECUTION REQUEST NOTIFICATION SOURCE OF IMPOSSIBILITY OF EXECUTION
S1205
NOTIFY EXECUTION REQUEST NOTIFICATION SOURCE OF EXECUTION ACCEPTANCE
S1206
REGISTER INTO DISPATCH LOOP, DRIVER DEFINED AS OBJECT OF EXECUTION INSTRUCTION

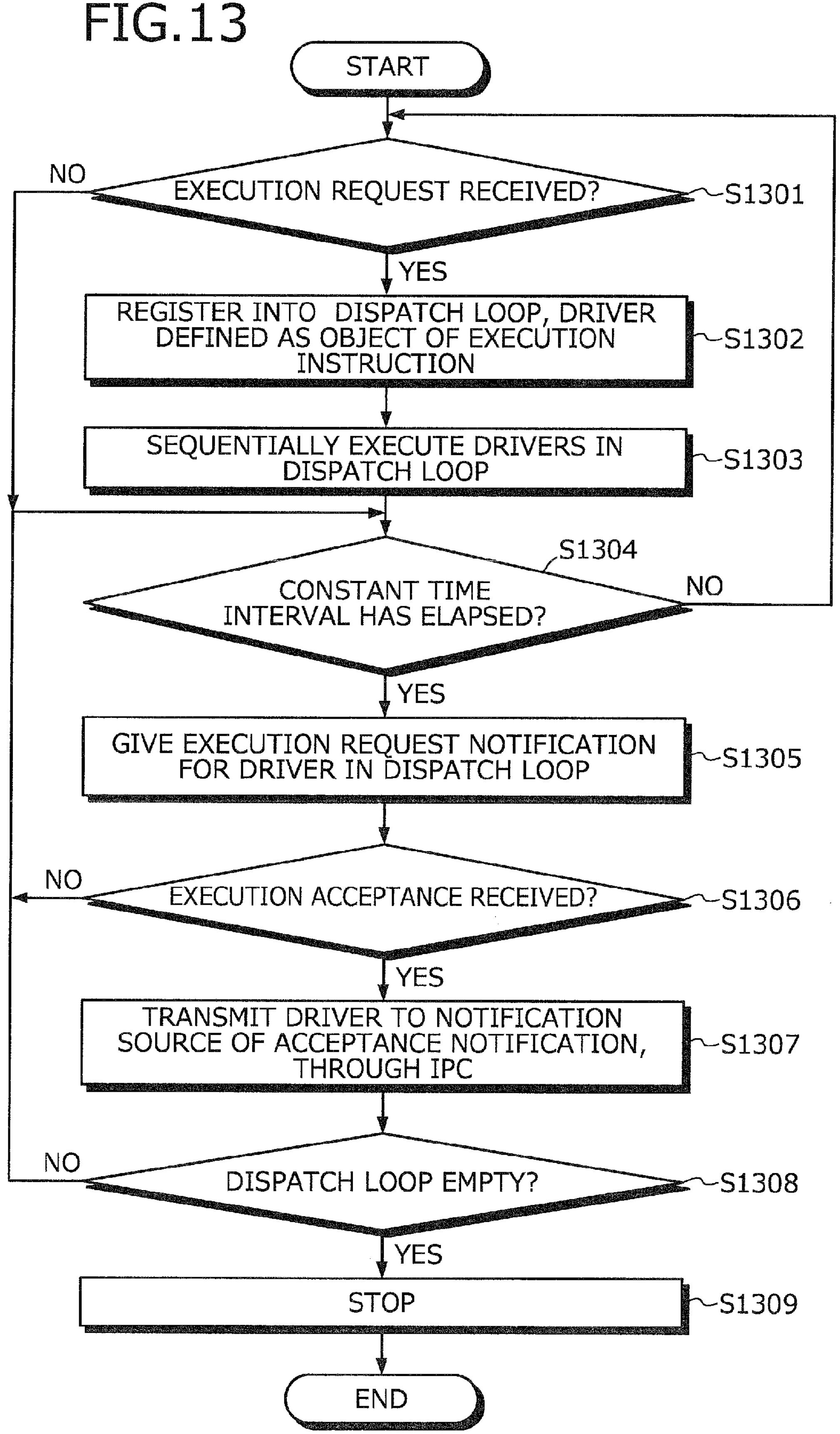
FIG.13
START
EXECUTION REQUEST RECEIVED?
S1301
NO
YES
REGISTER INTO DISPATCH LOOP, DRIVER DEFINED AS OBJECT OF EXECUTION INSTRUCTION
S1302
SEQUENTIALLY EXECUTE DRIVERS IN DISPATCH LOOP
S1303
S1304
CONSTANT TIME INTERVAL HAS ELAPSED?
NO
YES
GIVE EXECUTION REQUEST NOTIFICATION FOR DRIVER IN DISPATCH LOOP
S1305
NO
EXECUTION ACCEPTANCE RECEIVED?
S1306
YES
TRANSMIT DRIVER TO NOTIFICATION SOURCE OF ACCEPTANCE NOTIFICATION, THROUGH IPC
S1307
NO
DISPATCH LOOP EMPTY?
S1308
YES
STOP
S1309
END

DETECTION APPARATUS, NOTIFICATION METHOD, AND COMPUTER PRODUCT

CROSS REFERENCE TO RELATED APPLICATIONS

This application is a continuation application of International Application PCT/JP2012/057064, filed on Mar. 19, 2012 and designating the U.S., the entire contents of which are incorporated herein by reference.

FIELD

The embodiments discussed herein are related to a detection apparatus, a notification method, and a computer product.

BACKGROUND

In a conventionally known technique, a given processor predicts the load of processors in a multicore processor system to distribute the load to the processors (see, e.g., Japanese Laid-Open Patent Publication No. 2011-141782).

For example, in another conventionally known technique, load distribution is performed according to the operation rate of a processor in a multicore processor system (see, e.g., Japanese Laid-Open Patent Publication No. 2002-49405).

According to another conventionally known technique, all the processors that use a device driver are equipped with device driver in a multicore processor system and the processor that is to execute the device driver is determined by exclusive control (see, e.g., Japanese Laid-Open Patent Publication No. 2008-140191). As a result, since the processors can continue to standby for an execution request for the driver, response performance can be improved.

Nonetheless, although processors can continue the execution of a driver through exclusive control and load distribution, a problem arises in that the load amount on the processors increases consequent to processes for the exclusive control and the load distribution.

SUMMARY

According to an aspect of an embodiment, a detection apparatus includes multiple processors among which a first processor repeatedly executes in sequence, respective processes corresponding to multiple sensors; and a memory unit configured to enable access by the first processor and to store a processing time required for a first process corresponding to the respective processes, a processing time required for a second process corresponding to the respective processes, and a time constraint corresponding to the respective processes. The first processor stores to the memory unit, an execution start time corresponding to the respective processes when execution of the respective processes is switched. The first processor, when a process under execution among the respective processes executes the second process, adds to a difference of an execution start time stored in the memory unit and corresponding to a remaining process among the respective processes excluding the process under execution and a start time when the process under execution executes the second process, the processing time required for the second process of the process under execution and the processing time required for the first process of the remaining process. The first processor adds to the difference, based an execution sequence of the respective processes. The first processor determines whether a time calculated for the remaining process complies with a time constraint stored in the memory unit and corresponding to the remaining process, and notifies a second processor of an execution request for a process determined as not complying with the time constraint. The second processor is among the processors.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 is an explanatory view of an example of storage of processing times, time constraints, and execution start times of drivers;

FIG. 12 is a flowchart of a process procedure performed by the scheduler 121-*i* at the time of receipt of an execution request or an execution instruction; and FIG. 13 is a flowchart of a process procedure at the time of acceptance of an execution request performed by a scheduler 121-*j*.

DESCRIPTION OF EMBODIMENTS

Embodiments of a detection apparatus, a notification method, and a notification program will be described in detail with reference to the accompanying drawings. The detection apparatus is of sensor architecture having multiple sensors and coprocessors executing a process corresponding to data detected by the sensors. The detection apparatus uses the coprocessors to detect corruption of data detected by the sensors and to analyze the detected data. The notification program is a scheduler executed by the coprocessors.

Figure 1:
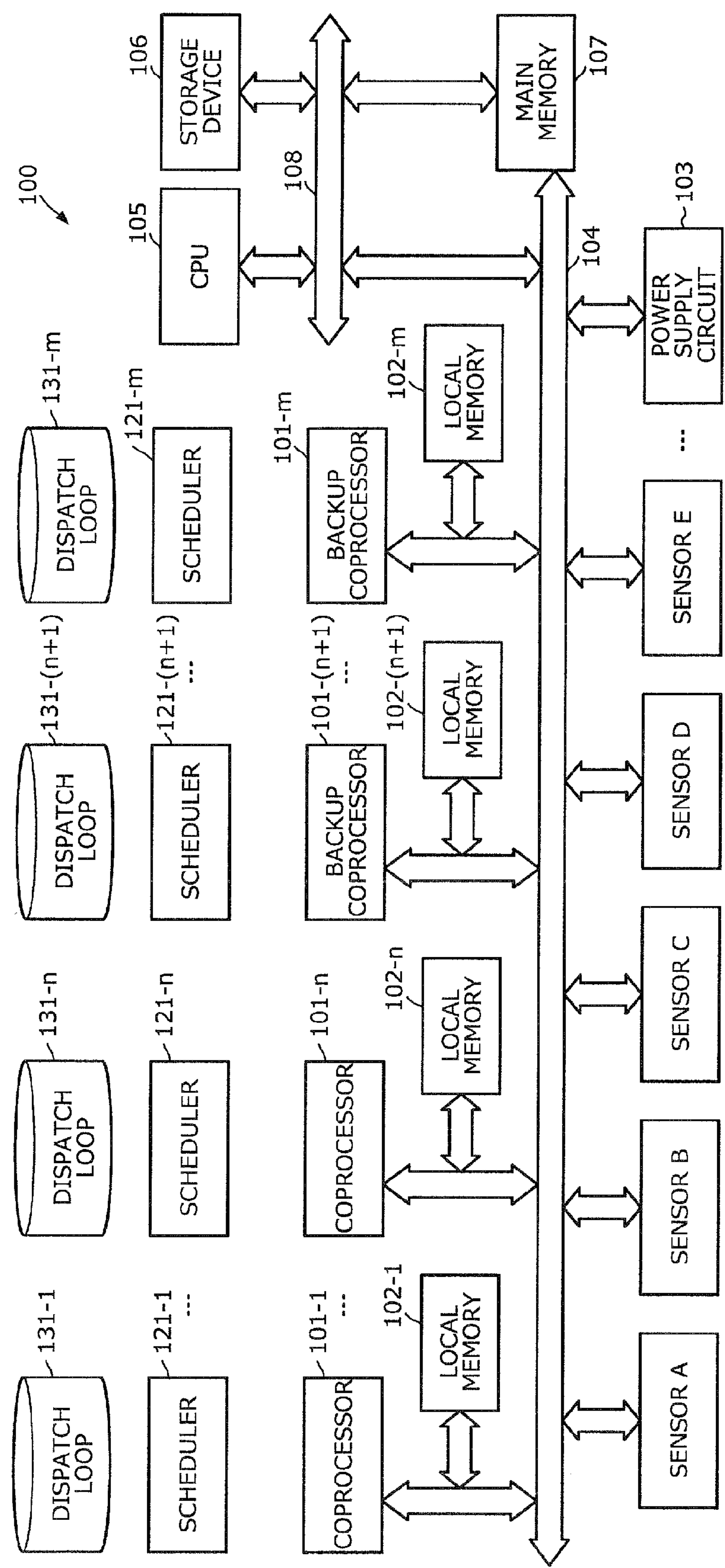
FIG. 1 is a block diagram of a hardware configuration example of a detection apparatus.

FIG. 1 is a block diagram of a hardware configuration example of the detection apparatus. A sensor architecture 100 has multiple coprocessors 101-1 to 101-*n*, multiple backup coprocessors 101-*n*+1 to 101-*m*, respective local memory 102, multiple sensors (a sensor A, a sensor B, a sensor C . . . ), and a power supply circuit 103, where "n≥1" and "m≥n+1" are satisfied. The sensor architecture 100 also has a central processing unit (CPU) 105 and main memory

107. The multiple sensors, the multiple coprocessors 101, and each local memory 102 are connected by a sensor bus 104.

The coprocessors 101, the number of the coprocessors 101, and the backup coprocessors 101 will be described. In this embodiment, the coprocessors 101 and the backup coprocessors 101 included in the sensor architecture 100 are processors for executing drivers of the sensors and do not execute a process of the other applications. Concerning the drivers of the sensors, response performance may be ignored as long as a constraint of the sensor is complied with. The constraint is a constraint on the time after an execution request for a driver of a sensor is made until the driver is actually executed.

Therefore, the multiple coprocessors 101-1 to 101-*n* execute the drivers without exclusive control and load distribution. A processable driver is assigned to the coprocessors 101, based on the processing time of a normal process that is a first process of a driver of each sensor. If the driver under execution cannot comply with the time constraint of the driver when a CPU call process defined as a second process is executed, the coprocessor 101 notifies another one of the coprocessors 101 of an execution request for the driver unable to comply with the time constraint. For example, the coprocessor 101 gives notification of an execution request to another one of the coprocessors 101 through inter-processor communication (IPC). The normal process defined as the first process and the CPU call process defined as the second process will be described later. As a result, the coprocessors 101 can reduce the load amount for the exclusive control and the load distribution.

The coprocessors 101 and the backup coprocessors 101 are prepared in the numbers sufficient to comply with the constraints of all the sensors in the case of maximum load. The "maximum load" corresponds to a case where all the drivers of the sensors execute CPU call processes. Therefore, a surplus of the coprocessors 101 is generated for loads other than the maximum load and electric power is consumed wastefully. Thus, for example, the drivers at the start of operation are evenly disposed among the minimum number of the coprocessors 101 capable of complying with the constraints of all the sensors on the assumption of a minimum load made by a designer of the sensor architecture 100. The "minimum load" corresponds to a case where the drivers of all the sensors execute the normal processes.

It is assumed as an example that the total number of the coprocessors 101 is three (m=3), that eight sensors are present (sensors A to H), and the loads of the drivers of the sensors are minimized. If one of the coprocessors 101 can execute the drivers of all the sensors, all the drivers are assigned to the one coprocessor 101. The remaining two coprocessors 101 are defined as the backup coprocessors 101 and are turned off to a stop state. Under the same condition, if the drivers of all the sensors can be executed by two of the coprocessors 101, four drivers are assigned to each of the two coprocessors 101. The remaining one coprocessor 101 is defined as the backup coprocessor 101 and is turned off into a stop state. This enables the sensor architecture 100 to reduce power consumption. Subsequently, for example, when the constraints of all the drivers cannot be complied with by only the activated coprocessors 101, the backup coprocessor 101 is activated.

Each of the coprocessors 101 executes a scheduler 121 and an assigned driver. The scheduler 121 controls execution of a driver assigned to the coprocessor 101. The scheduler 121 has a dispatch loop 131 and registration of identification information of a driver to the dispatch loop 131 is considered as assignment of the driver to the coprocessor 101. The scheduler 121 executed by the coprocessor 101 is different from the scheduler 121 executed by the backup coprocessor 101 and details of the respective schedulers 121 will be described later. As described above, the backup coprocessor 101 is not supplied with power from the power supply circuit 103 and is in a stop state at the time of activation of the sensor architecture 100.

The power supply circuit 103 supplies power to the units. For example, the power supply circuit 103 can interrupt the supply of power to the units and start the supply of power according to an instruction from the coprocessors 101 or the backup coprocessors 101.

The sensors (the sensor A, the sensor B, the sensor C, . . . ) detect data according to respective functions. For example, the sensors include an azimuth meter detecting an azimuth, a temperature sensor detecting body temperature or air temperature, a humidity sensor detecting humidity, and a heart rate monitor detecting a heart rate.

The drivers of the sensors are software related to the processes corresponding to the sensors. For example, in the case of a temperature sensor, the driver of the sensor may determine whether a temperature detected by the temperature sensor is a reference value or less. The drivers of the sensors may preliminarily be assigned by the designer of the sensor architecture 100. For example, the coprocessors 101 may start predetermined drivers when the sensor architecture 100 is powered on.

The driver of each of the sensors has a normal process and a CPU call process. As described above, a normal process is the first process and a CPU call process is the second process. A normal process includes an acquisition process, an analysis process, and a detection process. The CPU call process executed by the drivers of the sensors and specific processes executed by the CPU are referred to as application processes.

In the acquisition process, data detected by a sensor is acquired from a buffer of the sensor. In the analysis process, the acquired data is analyzed. In the detection process, a change in the acquired data is detected. In the CPU call process, when a change in data is detected, a process corresponding to the detected change is executed. The CPU 105 is called by the CPU call process and executes a given process. The CPU call process may be terminated after waiting for completion of the given process. For example, taking a sensor that measures heart rate as an example, in the analysis process, for example, the current heart rate of a subject is obtained. In the detection process, for example, a change in the heart rate to a threshold value or higher is detected. In the CPU call process, if the heart rate is detected to be the threshold value or more, the CPU 105 is notified that the heart rate is the threshold value or more. The CPU 105 may notify a server of a hospital or may execute a process of sounding an alarm.

The coprocessors 101-1 to 101-*n* and the backup coprocessors 101-(*n*+1) to 101-*m* respectively have local memory 102-1 to 102-*m*. The coprocessors 101 use the respective local memory 102 as work areas.

Each local memory 102 may be, for example, random access memory (RAM) or read only memory (ROM). The local memory 120 stores execution code of assigned drivers, a processing time required for a normal process of each of the assigned drivers, a processing time required for the CPU call process, a time constraint of the driver, and an execution start time of the driver. Examples of storage of the processing times, the time constraint, and the execution start time will be described later with reference to the drawings. The execution code is information such as assembly language identifiable according to driver by the coprocessors 101 and the CPU 105.

The CPU 105, the main memory 107, and the sensor bus 104 are connected by a main bus 108. However, configuration is not limited hereto and, for example, the CPU 105 and the main memory 107 may be connected via an interface (I/F) to the sensor bus 104. The I/F is connected through a communication line to a network such as a local area network (LAN), a wide area network (WAN), and the Internet and is connected to another apparatus via this network. The I/F administers an internal interface with the network and controls the input and output of data with respect to an external apparatus. For example, a modem or a LAN adapter may be employed as the I/F.

If multiple coprocessors 101 execute CPU call processes, the CPU 105 executes processes based on the CPU call processes. For example, the coprocessor 101 executing a process corresponding to a temperature sensor determines that a temperature is a reference value or more, the coprocessor 101 executes a process of notifying the CPU 105 of the occurrence of an abnormal temperature. Upon being notified of the occurrence of the abnormal temperature by the coprocessor 101, the CPU 105 notifies the user of the occurrence of the abnormal temperature. The method of notifying the user may be to display an error on a display or to sound a buzzer. Alternatively, for example, upon being notified of the occurrence of an abnormal temperature by the coprocessor 101, the CPU 105 may change temperature settings of air-conditioning equipment.

The main memory 107 is used as a work area of the CPU 150. The main memory 107 may be RAM, for example. A storage device 106 stores programs of an operating system (OS) and applications executed by the CPU 105. The storage device 106 may be ROM and a hard disk, for example. The storage device 106 may store programs related to the drivers of the sensors, for example. At the time of activation of the coprocessors 101, each of the coprocessors 101 may read a program related to an assigned driver from the storage device 106.

For example, the sensors can be classified roughly into polling-type sensors performing sensing at constant intervals and writing data into a buffer, and interrupt-type sensors performing sensing upon a predetermined event and writing data into a buffer. Respective constraint examples of the polling-type sensors and the interrupt-type sensors will be described with reference to FIGS. 2A and 2B.

Figure 2A:
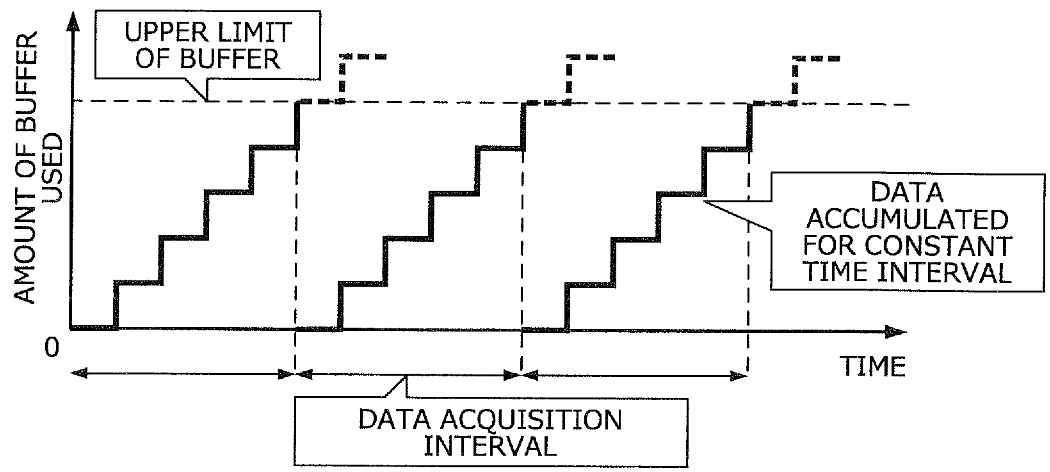
FIGS. 2A and 2B are explanatory views of constraint examples of a polling-type sensor and an interrupt-type sensor.
Figure 2B:
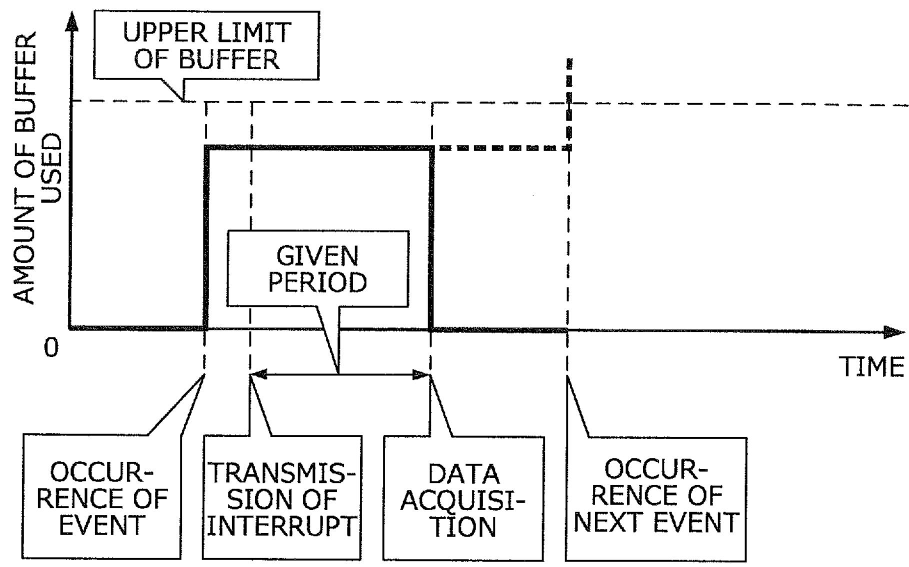

FIGS. 2A and 2B are explanatory views of constraint examples of a polling-type sensor and an interrupt-type sensor. The polling-type sensor may be a temperature sensor, for example. As depicted in FIG. 2A, the polling-type sensor acquires data detected by a sensor. The polling-type sensor acquires the data at constant intervals, from a buffer of the sensor. The constant interval differs according to the processing ability of the sensor and is, therefore, defined for each sensor. Thus, the constant interval is a time constraint for the polling-type sensor.

The interrupt-type sensor may be a button or a mouse, for example. As depicted in FIG. 2B, upon detecting the occurrence of an event, the interrupt-type sensor outputs an interrupt signal to the coprocessor 101. The coprocessor 101 fetches data stored to a buffer of the sensor within a predetermined time from the output of the interrupt signal. The predetermined time differs according to the function of the sensor function and is therefore defined for each sensor. Thus, the predetermined time is a constraint for the interrupt-type sensor.

In the following description, the drivers assigned to the coprocessors 101 are the drivers of the polling-type sensors. For example, the drivers of the interrupt-type sensors are assumed to be assigned to the coprocessors 101, where the assignment is fixed, and the drivers of the interrupt-type sensors will not be described in detail with reference to the drawings.

If the time constraint of a driver cannot be complied with when the CPU call process is executed, each of the coprocessors 101 requests another one of the coprocessors 101 to execute the driver that is unable to comply with the constraint. In FIGS. 3 to 6, description will be made by taking a case where n=2 and m=3, as an example.

Figure 3:
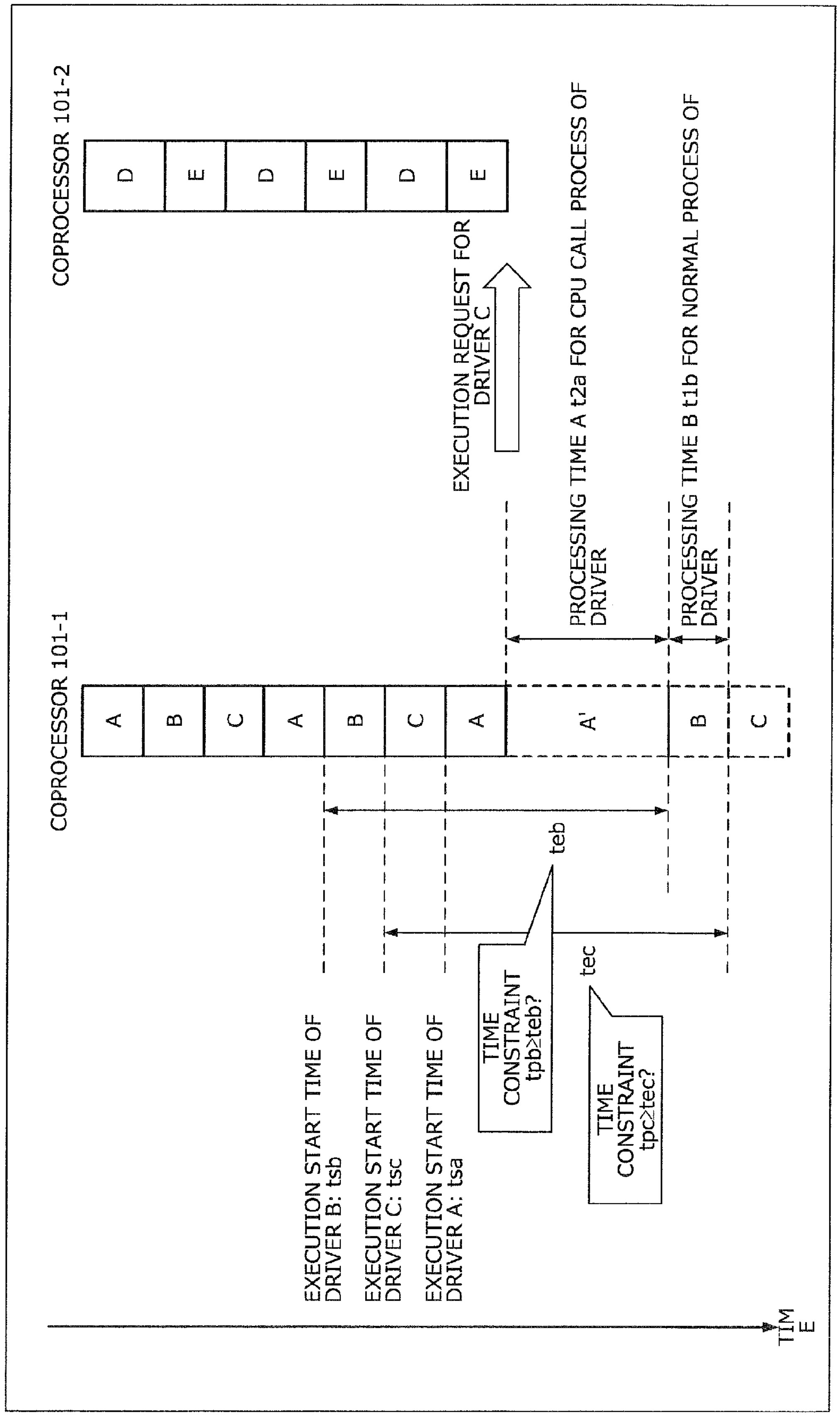
FIG. 3 is an explanatory view of an operation example of coprocessors 101.

FIG. 3 is an explanatory view of an operation example of the coprocessors 101. Drivers A, B, and C corresponding to respective sensors A, B, and C are assigned to the coprocessor 101-1. The assigned drivers A, B, and C are registered into a dispatch loop 131-1 and are repeatedly executed in sequence by a scheduler 121-1. Drivers D and E corresponding to sensors D and E, respectively, are assigned to the coprocessor 101-2. The assigned drivers D and E are registered into a dispatch loop 131-2 and repeatedly executed in sequence by a scheduler 121-2.

If all the coprocessors 101 executing drivers of the sensors are equipped with the drivers in the sensor architecture 100, when multiple coprocessors 101 execute a given driver at the same time, data acquired by execution of the driver may be corrupt. Therefore, exclusive control must be provided. In this embodiment, each of the coprocessors 101-1 and 101-2 is equipped with the assigned drivers of sensors and is not equipped with the drivers assigned to the other coprocessors 101. Therefore, the exclusive control need not be provided.

The schedulers 121-1 and 121-2 acquire the time of switching when the execution of a driver is switched, and store driver identification information and the current time in a correlated manner into the respective local memory 102. The time is acquired from timers included in the coprocessors 101, for example.

In FIG. 3, the scheduler 121-1 determines whether a condition of execution of the CPU call process is satisfied during execution of the driver A. In the example of FIG. 3, "A'" indicates the CPU call process of the driver A. For example, in the case of a driver of a temperature sensor, the CPU call process is executed if the temperature detected by the temperature sensor becomes equal to or greater than a threshold value, or less than or equal to a threshold value. Therefore, the scheduler 121-1 determines that the condition of execution of the CPU call process is satisfied. If the condition of execution of the CPU call process is satisfied, the scheduler 121-1 acquires from the local memory 102-1, the processing time required for the CPU call process of the driver A, respective time constraints of the drivers B and C, and processing times required for normal processes of the drivers B and C. The scheduler 121-1 also acquires from the local memory 102-1, the respective execution start times of the drivers B and C. The scheduler 121-1 further acquires the current time tc. The current time tc is acquired from a timer included in each of the coprocessors 101, for example.

If a driver under execution executes the CPU call process, the scheduler 121-1 calculates the difference of the execution start time stored in the local memory 102 and the current time tc, for each of the remaining drivers among the assigned drivers, excluding the driver under execution. The driver under execution is the driver A and the remaining drivers are the drivers B and C. To the difference calculated for each of the remaining drivers, the scheduler 121-1 adds the processing time required for the CPU call process of the driver under execution and the processing time required for the normal process of remaining drivers, based on the driver execution order.

For example, the scheduler 121-1 calculates the difference of an execution start time tsb of the driver B and the current time tc. The execution order of the drivers A, B, and C is determined by the order of registration in the dispatch loop 131-1. In the example depicted in FIG. 3, the driver B is executed after the driver A and therefore, the scheduler 121-1 adds a processing time t2a required for the CPU call process of the driver A to the calculated difference. As a result, a time teb is calculated that is required after the execution start time tsb of the driver B stored in the local memory 102 until the driver B is executed next.

For example, the scheduler 121-1 calculates the difference of an execution start time tsc of the driver C and the current time tc. The execution order of the drivers A, B, and C is already determined. In the example depicted in FIG. 3, the driver B is executed after the driver A and the driver C is executed after the driver B. Therefore, the scheduler 121-1 adds the processing time t2a required for the CPU call process of the driver A and a processing time t1b required for the normal process of the driver B to the calculated difference. As a result, a time tec is calculated that is required after the execution start time tsc of the driver C stored in the local memory 102 until the driver C is executed next time.

The scheduler 121-1 then determines whether the time calculated for a remaining driver complies with the time constraint thereof stored in the local memory 102. For example, the scheduler 121-1 determines if the time teb is less than or equal to a time constraint tpb of the driver B. If the time teb is less than or equal to the time constraint tpb of the driver B, the scheduler 121-1 determines that the time teb complies with the time constraint tpb of the driver B. For example, the scheduler 121-1 determines if the time tec is less than or equal to a time constraint tpc of the driver C. If the time tec is less than or equal to the time constraint tpc of the driver C, the scheduler 121-1 determines that the time tec complies with the time constraint tpc of the driver C. In this example, for example, it is determined that the time tec does not comply with the time constraint tpc of the driver C.

The scheduler 121-1 notifies another activated coprocessor 101 of an execution request for the driver C. For example, the scheduler 121-1 gives notification of the execution request to another coprocessor 101 through IPC. In this example, the other activated coprocessor 101 is the coprocessor 101-2. For example, the execution request has the execution start time tsc of the driver C, the time constraint tpc of the driver C, and a processing time t1c required for a normal process of the driver C.

As a result, the sensor architecture can continuously execute the drivers of the sensors without exclusive control or distributed processing.

Figure 4:
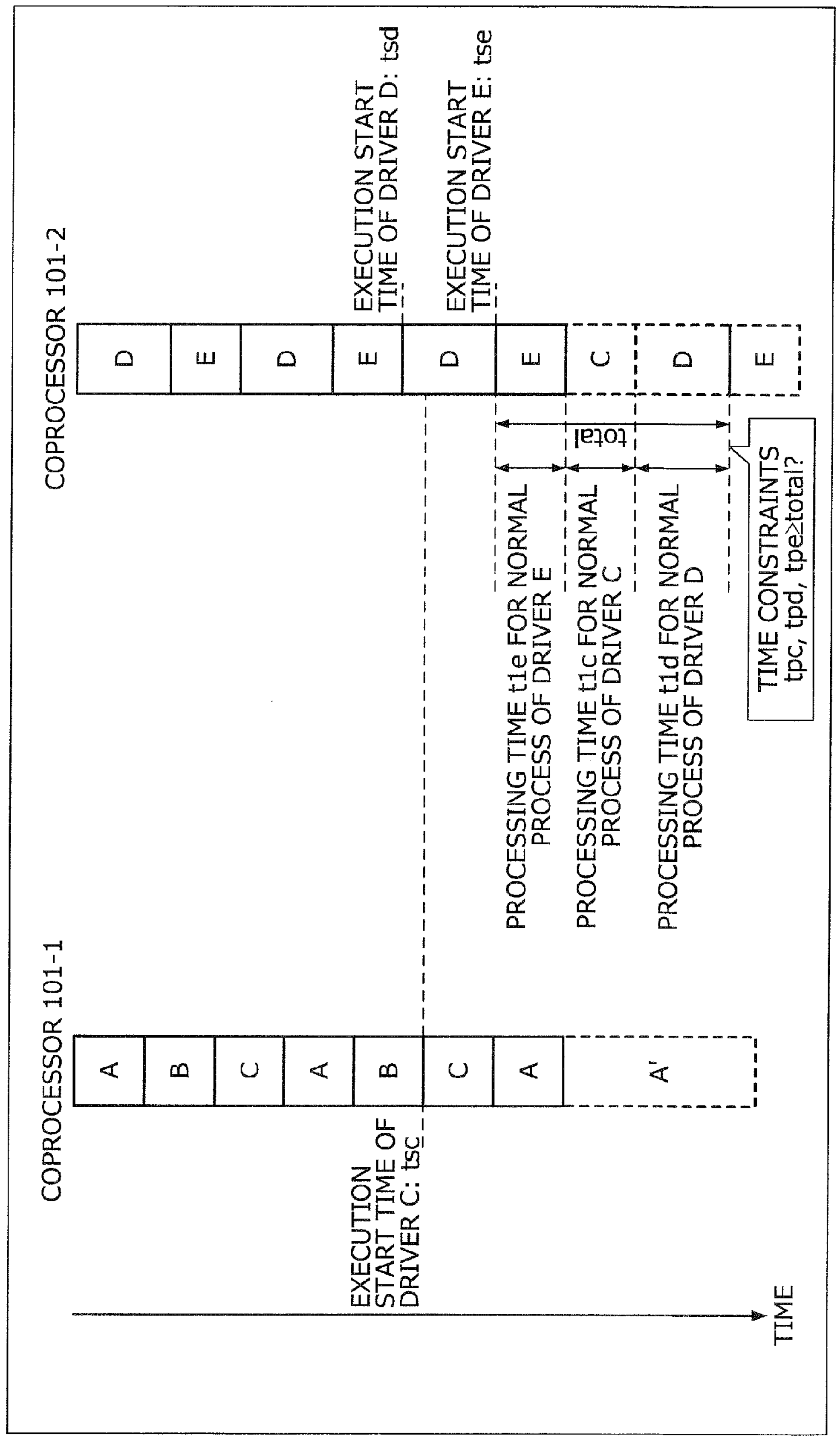
FIG. 4 is an explanatory view of an operation example of the coprocessors 101 in a case of acceptance of an execution request.

FIG. 4 is an explanatory view of an operation example of the coprocessors 101 in the case of acceptance of an execution request. The scheduler 121-2 accepts the execution request for the driver C, from the scheduler 121-1.

The scheduler 121-2 calculates a total value of a processing time required for the normal process of the driver defined as the object of the execution request and processing times required for the normal processes of all the assigned drivers. For example, a summed value_total is the sum of a processing time t1d required for the normal process of the driver D, a processing time t1e required for the normal process of the driver E, and the processing time t1c required for the normal process of the driver C.

The scheduler 121-2 determines whether the summed value_total complies with the time constraint of the driver defined as the object of the execution request and the time constraints of the assigned drivers. For example, the scheduler 121-2 determines if the summed value_total is less than or equal to the time constraint tpc of the driver C defined as the object of the execution request and the respective time constraints tpd and tpe of the assigned drivers D and E.

If the summed value_total is less than or equal to the time constraints tpc, tpd, and tpe, the scheduler 121-2 determines that the summed value_total complies with the time constraint tpc and the time constraints tpd and tpe. On the other hand, if any one of the time constraints tpc, tpd, and tpe is less than the summed value_total, the scheduler 121-2 determines that the summed value_total does not comply with the time constraints tpc, tpd, and tpe.

If it is determined that any one of the time constraints of the drivers cannot be complied with, the scheduler 121-2 notifies the scheduler 121-1 that is the execution request notification source that execution is impossible. If it is determined that the time constraints of all the drivers can be complied with, the scheduler 121-2 notifies the scheduler 121-1 that is the execution request notification source of execution acceptance. For example, the scheduler 121-2 notifies the execution request notification source of the impossibility of execution or the execution acceptance through IPC.

As a result, the sensor architecture 100 enables compliance with the time constraints of all the drivers of the sensors without employing exclusive control or distributing processing. Therefore, the sensor architecture 100 can reduce the amount of processing load by the amount required for exclusive control and distributed processing during operation.

In the example depicted in FIG. 4, the total value of the processing times required for the normal processes of the drivers is used in determining whether the time constraints of the drivers are complied with. However, configuration is not limited hereto and the scheduler 121-2 may predict the next start time in detail, for each of the drivers, based on stored execution start times tsd, tse, and tsc of the drivers. Whether the difference of the execution start time stored for each of the drivers and a predicted execution start time complies with the time constraint may then be determined. As a result, the sensor architecture 100 can improve the accuracy of determining whether the time constraints can be complied with.

As described above, the coprocessor 101 to which no driver has been assigned by the designer of the sensor architecture 100 is kept stopped as the backup coprocessor 101. As a result, the sensor architecture 100 can reduce power consumption. If the time constraints of all the drivers cannot be complied with by only the activated coprocessors 101, the backup coprocessor 101 is activated and a driver is assigned to the backup coprocessor 101.

Figure 5:
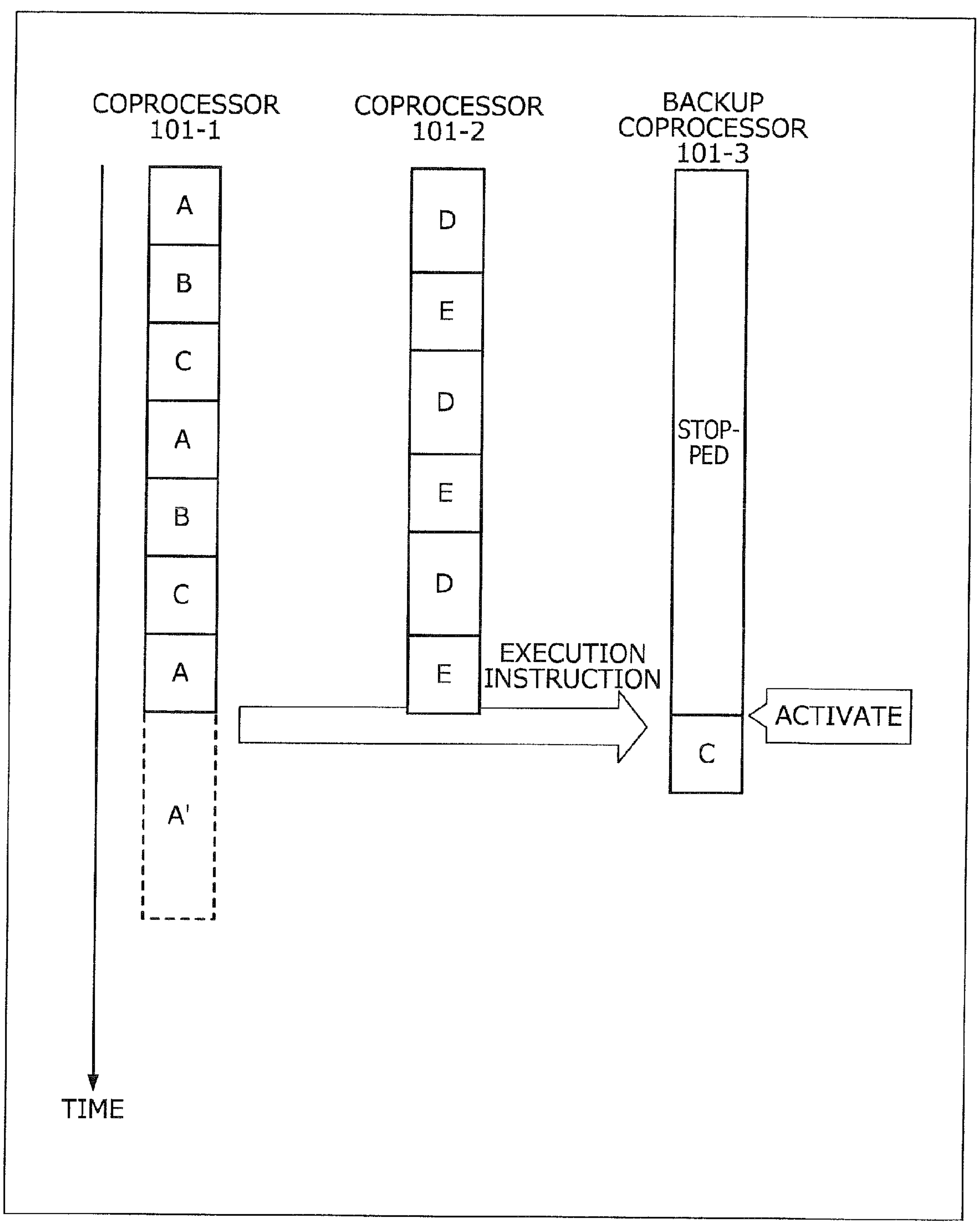
FIG. 5 is an explanatory diagram of an example of notifying a backup coprocessor 101 of an execution instruction.

FIG. 5 is an explanatory diagram of an example of notifying the backup coprocessor 101 of an execution instruction. Upon receiving notification of the impossibility of execution from the scheduler 121-2, the scheduler 121-1 activates the backup coprocessor 101-3. For example, the scheduler 121-1 notifies the power supply circuit 103 of an instruction to supply power to the backup coprocessor 101-3. For example, the power supply circuit 103 consequently receives the instruction to supply power to the backup coprocessor 101-3 and as a result, the backup coprocessor 101-3 is activated. The scheduler 121-1 notifies the backup coprocessor 101-3 of an execution instruction for the driver C.

For example, the execution instruction for the driver C has the execution code of the driver C, the execution start time tsc of the driver C, the processing time t1c required for the normal process of the driver C, a processing time t2c required for the CPU call process of the driver C, and the time constraint tpc of the driver C. A scheduler 121-3 executed by the backup coprocessor 101-3 after the activation accepts the execution instruction for the driver C and executes the driver C.

Therefore, the sensor architecture 100 can continuously execute the drivers of the sensors and can improve reliability.

Figure 6:
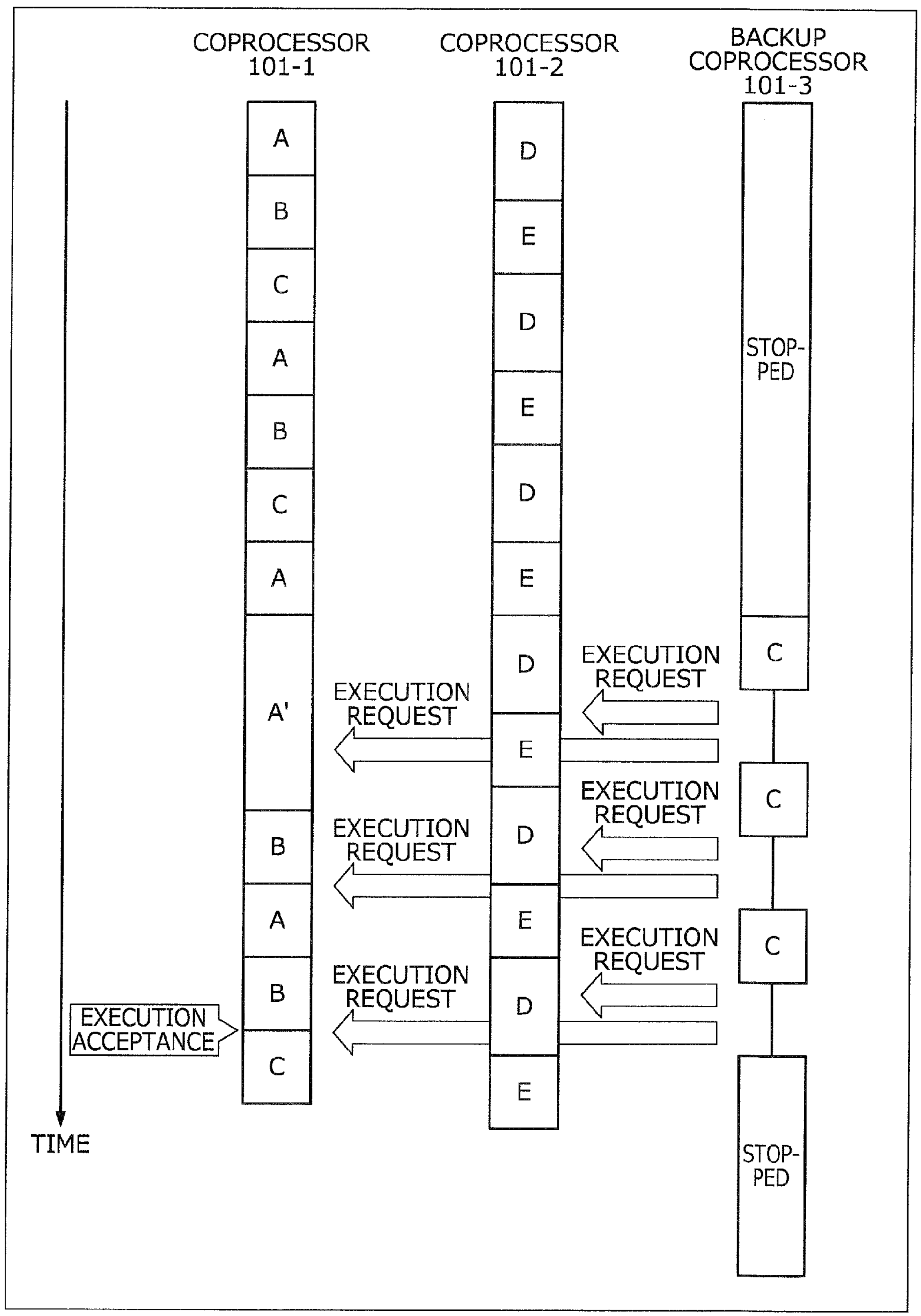
FIG. 6 is an explanatory view of an example of an execution request by the backup coprocessor 101.

FIG. 6 is an explanatory view of an example of an execution request by the backup coprocessor 101. The scheduler 121 notifies at constant time intervals, the coprocessor 101-1 and the coprocessor 101-2 of an execution request for the assigned driver C.

The scheduler 121-1 and the scheduler 121-2 upon receiving the execution request from the scheduler 121-3, determine whether the respective time constraints of the assigned drivers and the driver of the received execution request can be complied with, as depicted in FIG. 3. If the respective time constraints of the assigned drivers and the driver of the execution request can be complied with, the scheduler 121-1 or the scheduler 121-2 notifies the backup coprocessor 101-3 that is the execution request notification source of execution acceptance. If any one of the time constraints of the assigned drivers and the driver of the execution request cannot be complied with, the scheduler 121-1 or the scheduler 121-2 notifies the execution request notification source, i.e., the backup coprocessor 101-3, of the impossibility of execution. For example, the scheduler 121-1 or the scheduler 121-2 gives notification of the impossibility of execution or execution acceptance through IPC.

Upon receiving the execution acceptance from either of the coprocessors 101, the scheduler 121-3 notifies the coprocessor 101 that is the execution acceptance notification source of the execution instruction for the driver C. The scheduler 121-3 gives notification of the execution instruction for the driver C through IPC. The scheduler 121-3 then stops the backup coprocessor 101-3.

As a result, if the coprocessors 101 have no reserve capacity, the sensor architecture 100 causes the backup coprocessor 101 to operate in order to comply with the time constraints of the drivers of the sensors. If the coprocessors 101 have reserve capacity, the sensor architecture 100 can stop the backup coprocessor 101. As a result, the sensor architecture 100 can continuously execute the drivers. Therefore, the sensor architecture 100 can reduce power consumption while improving reliability.

Description will be made of an example of storage of the processing time required for the normal process, the processing time required for the CPU call process, the time constraint, and the execution start time stored for each driver.

FIG. 7 is an explanatory view of an example of storage of the processing times, the time constraints, and the execution start times of the drivers. Driver tables 700 are stored in the local memory 120 of each of the coprocessors 101 and store driver information related to the assigned drivers. In FIG. 7, a driver table 700-1 describes information concerning the drivers A, B and C assigned to the coprocessor 101-1. A driver table 700-2 describes information concerning the drivers D and E assigned to the coprocessor 101-2.

The driver tables 700 have fields for driver IDs, processing times of normal processes, processing times of CPU call processes, time constraints, and execution start times. The driver IDs are identifiers of drivers to be executed by the coprocessors 101. In this embodiment, the identifiers of the drivers are the same as the identifiers of the sensors. The first processing times are the processing times required for the normal processes of the drivers. The second processing times are processing times required for the CPU call processes of the drivers.

As described above, the time constraint is a constant interval defined for each sensor and for acquiring data detected by the sensor from a buffer of the sensor. The execution start time is a time stored at the start of execution of a driver. The field of the execution start time is updated each time a driver is executed by the coprocessor 101 to which the driver has been assigned.

By setting the information in the fields, driver information (e.g., 701-1, 701-2, and 701-3) is stored as records in the driver table 700-1. By setting the information in the fields, driver information (e.g., 702-1 and 702-2) is stored as records in the driver table 700-2.

A "-number" appended to the driver table 700 is the same as a "-number" of the local memory 102 and the driver tables 700 are assumed to be respectively stored in the local memory 120 to which the same number is appended.

When giving an execution instruction to another one of the coprocessors 700, each of the schedulers 121 adds to the execution instruction, the driver information of the driver that is the object of the execution instruction. After giving the execution instruction, each of the coprocessors 101 deletes the driver information along with the execution code of the driver that is the object of the execution instruction, from the driver table 700 in the local memory 102 thereof. Therefore, since the coprocessor 101 to which a driver has been assigned merely needs to have the execution code and the driver information of the assigned driver, the need for the exclusive control is eliminated.

Figure 8:
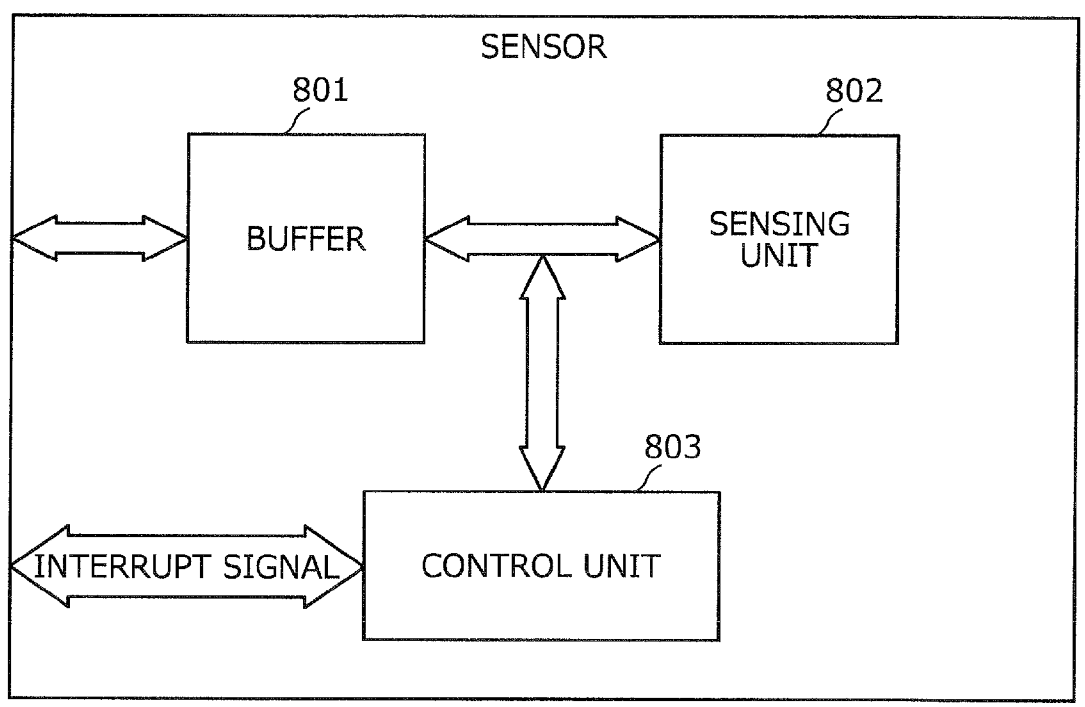
FIG. 8 is an explanatory view of a functional example of a sensor.

FIG. 8 is an explanatory view of a functional example of a sensor. For example, the sensor depicted in FIG. 8 has a buffer 801, a control unit 803, and a sensing unit 802. For example, the sensor depicted in FIG. 8 corresponds to the sensors A to E. For example, the sensing unit 802 executes a detection process according to a function of a sensor x. For example, when data detected by the detection process is stored to the buffer, the control unit 803 outputs an interrupt signal to the coprocessors 101. In the case of the polling-type sensor, the control unit 803 need not output the interrupt signal. For example, if the buffer 801 is present in plural, the control unit 803 may have a function of switching the buffer that is to store the data detected by the sensing unit 802.

Taking a temperature sensor as an example, the sensing unit of the temperature sensor detects a temperature, for example. The sensing unit 802 of the temperature sensor converts analog data indicative of the detected temperature into digital data and stores the digital data into the buffer 801, for example.

Figure 9:
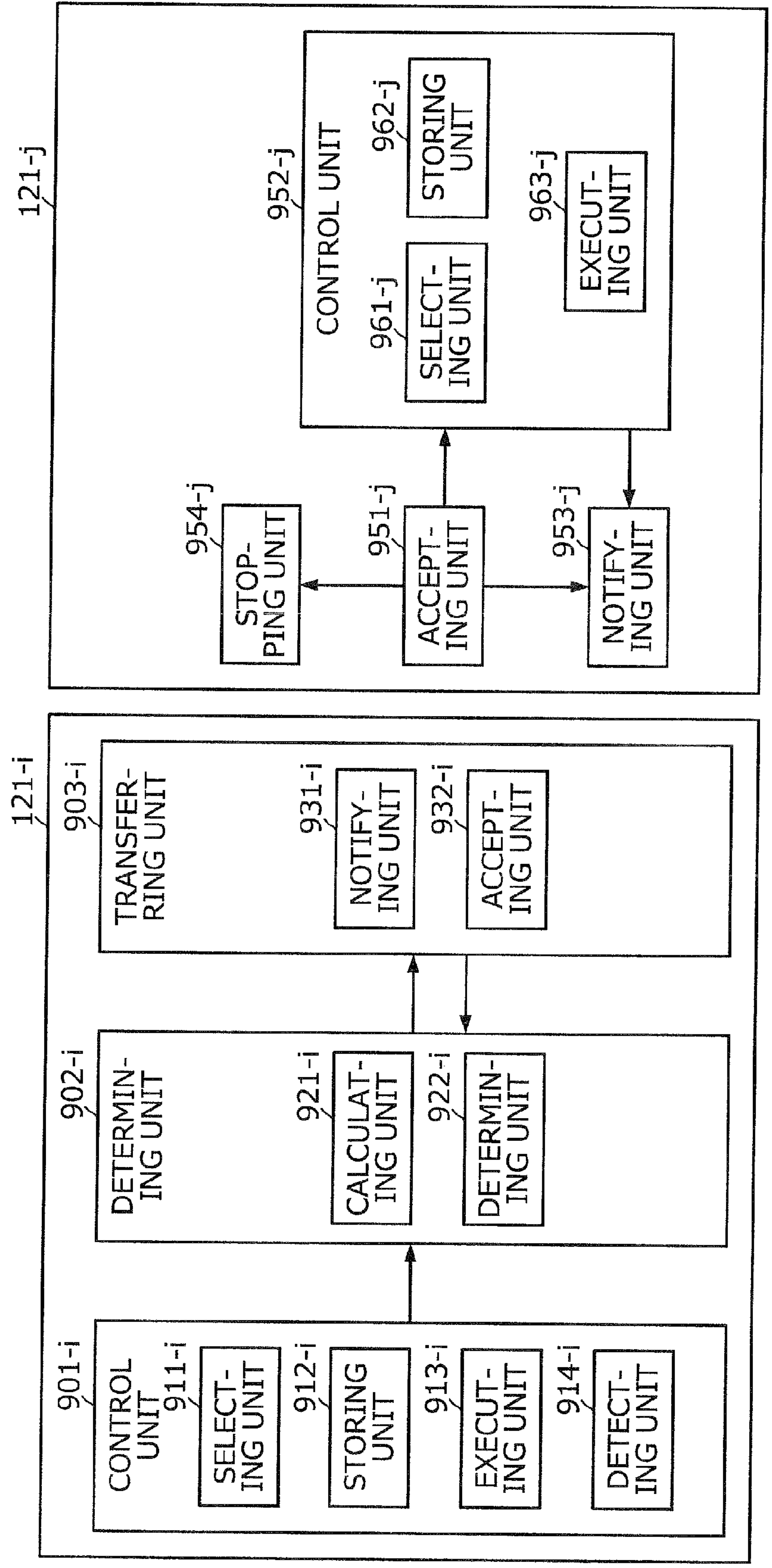
FIG. 9 is a block diagram of a function example of schedulers.

FIG. 9 is a block diagram of a function example of the schedulers. The functions of the schedulers are different between the coprocessor 101 and the backup coprocessor 101. A scheduler 121-*i* of a coprocessor 101-*i* not for backup has a control unit 901-*i*, a determining unit 902-*i*, and a transferring unit 903-*i*. In the examples depicted in FIGS. 3 to 6, i is 1 and 2. A scheduler 121-*j* of a backup coprocessor 101-*j* has an accepting unit 951-*j*, a control unit 952-*j*, a notifying unit 953-*j*, and a stopping unit 954-*j*. In the examples depicted in FIGS. 3 to 6, j is 3.

Processes of the control unit 901-*i* to the transferring unit 903-*i* are coded in the scheduler 121-*i* stored in a memory device such as local memory 102-*i* or the storage device 106, for example. The coprocessor 101-*i* loads the scheduler 121-*i* from the memory device and executes the processes coded in the scheduler 121-*i* to implement functions of the control unit 901-*i* to the transferring unit 903-*i*.

Processes of the accepting unit 951-*j* to the stopping unit 954-*j* are coded in the scheduler 121-*j* stored in a memory device such as local memory 102-*j* or the storage device 106, for example. The coprocessor 101-*j* loads the scheduler 121-*j* from the memory device and executes the processes coded in the scheduler 121-*j* to implement the functions of the accepting unit 951-*j* to the stopping unit 954-*j*.

The processing results of the functional units are stored to work areas of the respective local memory 102, for example. In the following descriptions, a "-number" appended to the functional units correspond to the number appended to the coprocessors 101 and indicates that the functional unit is that of the scheduler of the corresponding coprocessor 101.

For example, the control unit 901-*i* controls execution of an assigned driver of a sensor. For example, the control unit 901-*i* has a selecting unit 911-*i*, a storage unit 912-*i*, an executing unit 913-*i*, and a detecting unit 914-*i*. For example, the selecting unit 911-*i* puts all the preliminarily assigned drivers of the sensors into a dispatch loop 131-*i* after activation of the sensor architecture 100 and sequentially selects the drivers from the dispatch loop 131-*i*.

For example, the storage unit 912-*i* retrieves from a driver table 700-*i* stored in the local memory 102-*i*, the driver information corresponding to a driver selected based on identification information of the driver selected by the selecting unit 911-*i*. For example, the storage unit 912-*i* acquires the current time from a timer included in the coprocessor 101-*i*. For example, the storage unit 912-*i* stores the acquired current time into the execution start time field of the retrieved information.

For example, the executing unit 913-*i* starts the execution of the selected driver. For example, the detecting unit 914-*i* detects whether a given condition is satisfied during execution of the normal process of the selected driver. The given condition is a condition of execution of the CPU call process and is defined for each driver.

For example, the determining unit 902-*i* determines whether the constraint of the drivers registered in the dispatch loop 131-*i* can be complied with even when the CPU call process of the driver under execution is executed, if the detecting unit 914-*i* detects that the certain condition is satisfied. For example, the determining unit 902-*i* has a calculating unit 921-*i* and a determining unit 922-*i*.

For example, the calculating unit 921-*i* acquires from the driver table 700-*i*, the execution start time for each of the remaining drivers among the drivers registered in the dispatch loop 131-*i*, excluding the driver under execution. For example, the calculating unit 921-*i* acquires the current time. The calculating unit 921-*i* calculates the difference of the execution start time and the current time, for each of the remaining drivers.

For example, the calculating unit 921-*i* acquires from the driver table 700-*i*, the processing times required for the normal processes of the remaining drivers and the processing time required for the CPU call process of the driver under execution. As described above, the processing time required for the normal process is registered in the first processing time field of the driver table 700-*i* and the processing time required for the CPU call process is registered in the second processing time field of the driver table 700-*i*. The calculating unit 921-*i* adds to the difference for each of the remaining drivers, the acquired processing time required for the CPU call process of the driver under execution. The calculating unit 921-*i* adds to the addition result for each of the remaining drivers, the processing times required for the normal processes of the remaining drivers, based on the order of registration in the dispatch loop 131-*i*. As a result, for each of the remaining drivers, a time is calculated between the execution start time of the last execution of the remaining driver and the predicted execution start time of the next execution of the remaining driver.

The determining unit 922-*i* determines whether the time calculated by the calculating unit 921-*i*, for each of the remaining drivers complies with the time constraint thereof stored in the local memory 102-*i*. For example, the determining unit 922-*i* acquires the time constraint of the remaining driver from the driver table 700-*i*, for each of the remaining drivers. For example, the determining unit 922-*i* determines if the time calculated by the calculating unit 921-*i* for each of the remaining drivers is less than or equal to the acquired time constraint. If the time calculated for each of the remaining drivers is less than or equal to the acquired time constraint, the determining unit 922-*i* determines that the time constraint is complied with. On the other hand, if the time calculated for each of the remaining drivers is greater than the acquired time constraint, the determining unit 922-*i* determines that the time constraint is not complied with.

The transferring unit 903-*i* notifies another one of the multiple coprocessors 101 of an execution request for the driver determined by the determining unit 922-*i*, as not complying with the time constraint. For example, the transferring unit 903-*i* has a notifying unit 931-*i* and an accepting unit 932-*i*.

For example, the notifying unit 931-*i* notifies the coprocessor 101 of the execution request. As described above, for example, the execution code of the driver defined as the request object and the driver information of the driver are added to the execution request. The accepting unit 932-*i* receives from the coprocessor 101, notification of the execution acceptance or the impossibility of execution. If the accepting unit 932 receives notification of execution acceptance, the notifying unit 931 notifies the execution acceptance notification source, i.e., the coprocessor 101, of an execution instruction.

On the other hand, if the accepting unit 932-*i* receives notification of the impossibility of execution, the notifying unit 931-*i* activates the backup coprocessor 101. After the activation of the backup coprocessor 101, the notifying unit 931-*i* notifies the backup coprocessor 101 of the execution instruction for the driver determined as not complying with the time constraint.

The execution code and the driver information of the driver defined as the object of the execution instruction are stored to the local memory 102 of the execution instruction notification destination and therefore, after the completion of transfer of the driver, the notifying unit 931-*i* deletes the execution code and the driver information of the driver from the local memory 700-*i*. As a result, the execution code and the driver information of each of the drivers are stored in the local memory 102 of either the coprocessor 101 or the activated backup coprocessor 101. Therefore, even if exclusive control is not provided between the coprocessor 101 and the activated backup coprocessor 101, the execution of the driver can be continued. After the completion of transfer of the driver, the notifying unit 931-*i* deletes the transferred driver also from the dispatch loop 131-*i*.

The accepting unit 932-*i* receives the execution request from another one of the coprocessors 101. The determining unit 902-*i* determines whether all the constraints of the driver defined as the object of the execution request and of the assigned drivers can be complied with, if an execution request from the other coprocessor 101 has been received by the accepting unit 932-*i*.

For example, the calculating unit 921-*i* calculates a total of the processing time required for the normal process of the driver defined as the object of the execution request and the processing times required for the normal processes of the assigned drivers. The determining unit 902-*i* determines if the total is less than or equal to the time constraint of each of the drivers. As a result, it is determined whether the time constraints of the driver defined as the object of the execution request and of the assigned drivers can be complied with.

If the determining unit 902-*i* determines that the constraints can be complied with, the notifying unit 931-*i* notifies the execution request notification source of the execution acceptance. On the other hand, if the determining unit 902-*i* determines that any of the constraints of the driver defined as the object of the execution request and of the assigned drivers cannot be complied with, the notifying unit 931-*i* notifies the execution request notification source of the impossibility of execution. For example, the notifying unit 931-*i* gives notification through IPC.

Functions of the scheduler 121-*j* executed by the backup coprocessor 101-*j* will be described. The coprocessor 101-*i* activates the backup coprocessor 101-*j*. The accepting unit 951-*j* receives an execution instruction from the coprocessor 101-*i*. As described above, for example, the execution code of the driver defined as the request object and the driver information of the driver are added to the execution instruction. The accepting unit 951-*j* stores into the local memory 102-*j*, the driver information and the execution code included in the received execution instruction.

When the execution instruction is received, the control unit 952-*j* registers to the dispatch loop 131, the driver defined as the object of the execution instruction. The control unit 952-*j* repeatedly executes the drivers in the dispatch loop 131-*j*.

For example, the control unit 952-*j* has a selecting unit 961-*j*, a storing unit 962-*j*, and an executing unit 963-*j*. The selecting unit 961-*j* sequentially selects the drivers in the dispatch loop 131-*j*. If the selecting unit 961-*j* newly selects a driver, the storing unit 962-*j* acquires the current time. The storing unit 962-*j* stores the acquired time into the execution start time field of the driver table 700. The executing unit 963-*j* executes the selected driver.

At constant time intervals until the accepting unit 951-*j* receives notification of execution acceptance, the notifying unit 953-*j* notifies the coprocessors 101, excluding the backup coprocessors 101, of an execution request for the assigned driver. For example, the constant time intervals may be determined by the designer of the sensor architecture 100 or may coincide with timing of a timer interrupt by a timer included in the backup coprocessor 101.

When the accepting unit 951-*j* receives notification of execution acceptance, the notifying unit 953-*j* notifies the execution acceptance notification source of an execution instruction, through IPC. If the dispatch loop 131 is empty, the stopping unit 954-*j* powers off and stops the backup coprocessor 101-*j*. For example, the stopping unit 954-*j* may notify the power supply circuit 103 of an instruction to set the power supplied to the backup coprocessor 101-*j* to zero [V].

Figure 10:
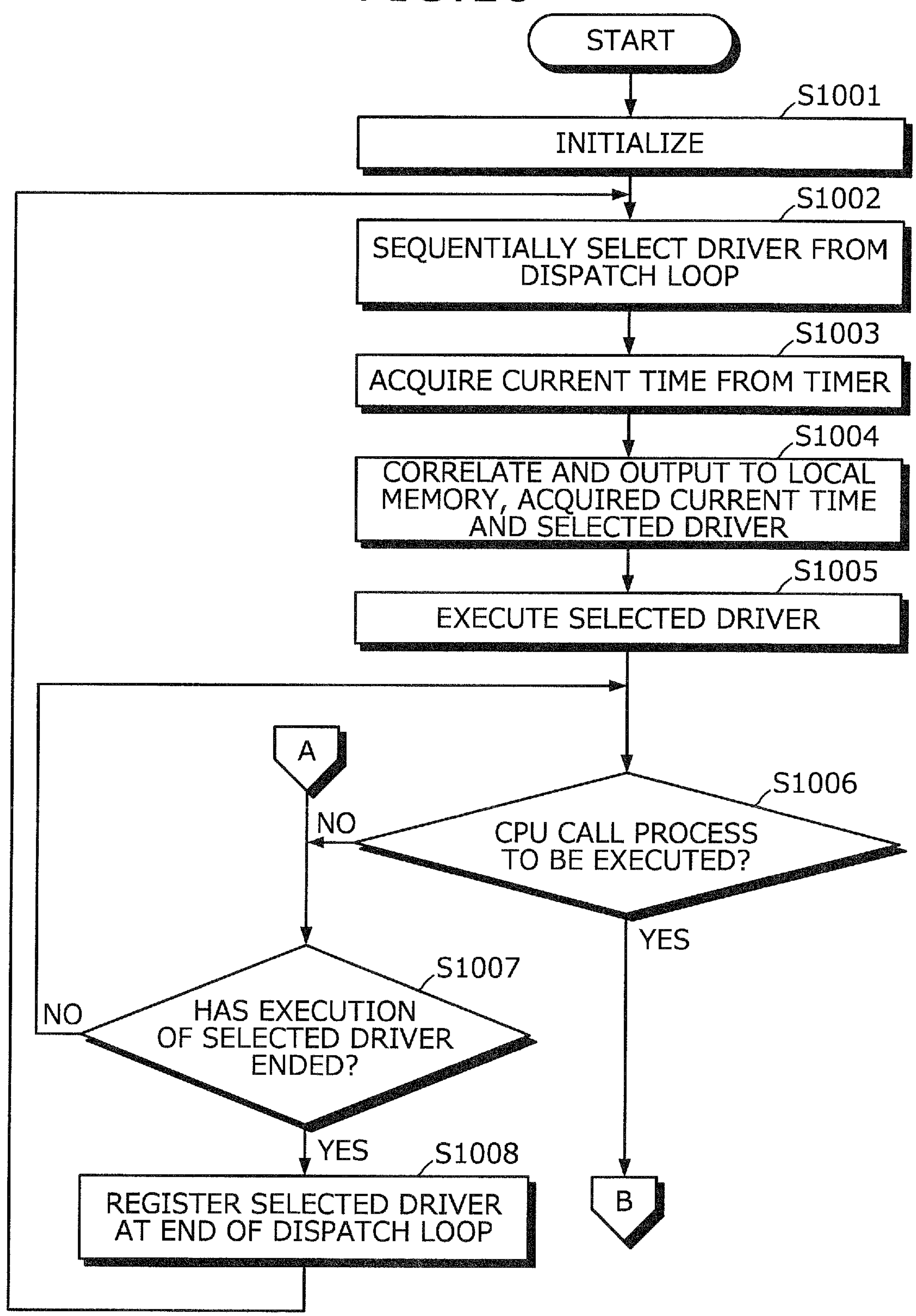
FIGS. 10 and 11 are flowcharts of a process procedure executed by a scheduler 121-*i;*
Figure 11:
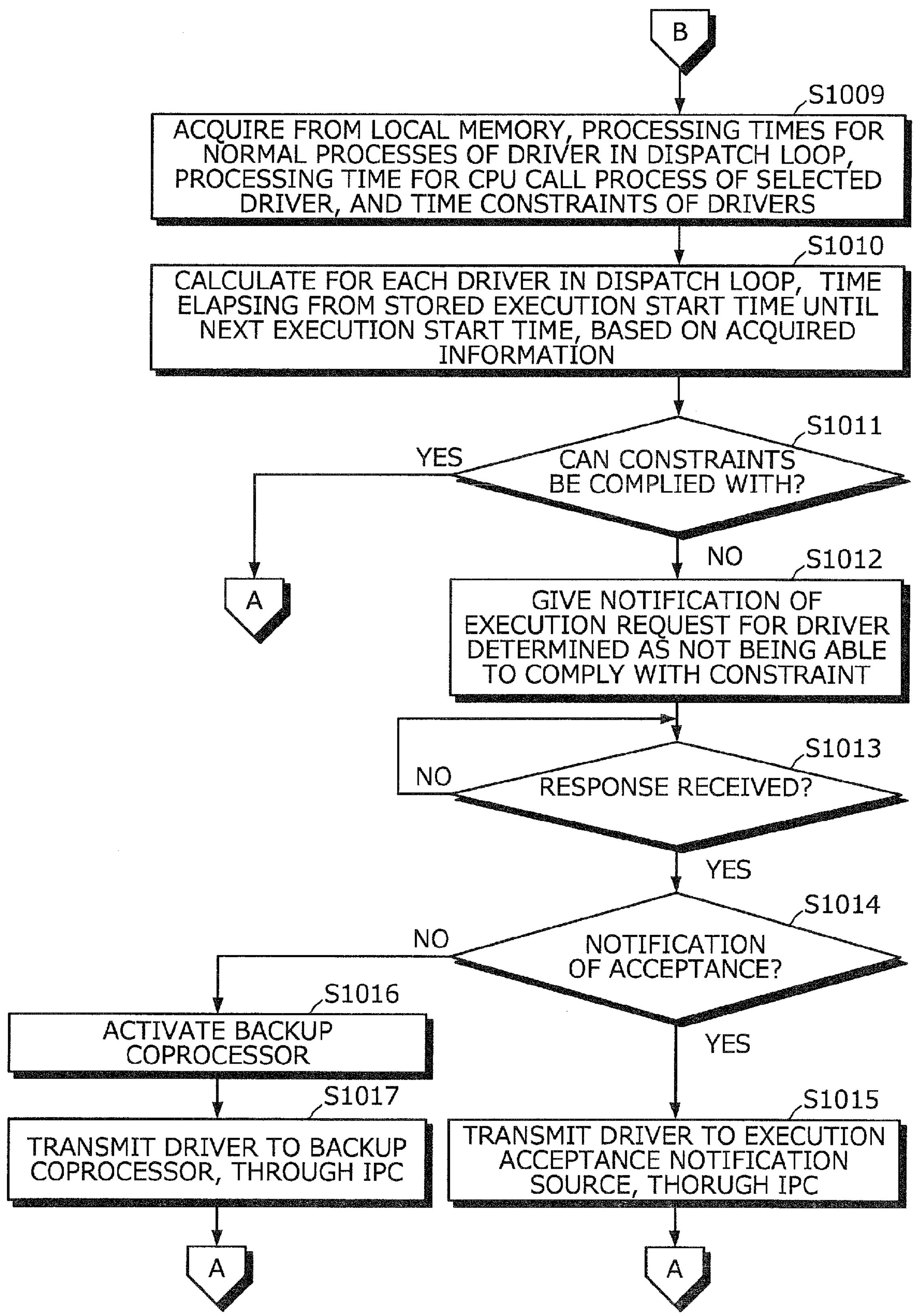

FIGS. 10 and 11 are flowcharts of a process procedure executed by the scheduler 121-*i*. The scheduler 121-*i* is executed by the coprocessor 101-*i*. The coprocessor 101-*i* has drivers assigned thereto in advance by the designer of the sensor architecture 100. The scheduler 121-*i* performs initialization (step S1001). The scheduler 121-*i* sequentially selects the drivers from the dispatch loop 131-*i* (step S1002). A driver selected in this case is referred to as a selected driver.

The scheduler 121-*i* acquires the current time from the timer (step S1003), and outputs the acquired current time and the selected driver in a correlated manner to the local memory 102-*i* (step S1004). The scheduler 121-*i* executes the selected driver (step S1005).

The scheduler 121-*i* determines whether the CPU call process is to be executed (step S1006). As described above, in the case of the driver of a temperature sensor, if it is determined that a detected temperature is equal to or greater than a threshold, or less than a threshold, it is determined that the CPU call process is newly executed. In this example, if the satisfaction of the condition of execution of the CPU call process is detected at step S1006, it is determined that the CPU call process is to be executed. Therefore, if the CPU call process is being executed, it is not determined that the CPU call process is to be executed.

If the CPU call process is not to be executed (step S1006: NO), the scheduler 121-*i* determines whether the execution of the selected driver has ended (step S1007). If the execution of the selected driver has not ended (step S1007: NO), the scheduler 121-*i* returns to step S1006. If the execution of the selected driver has ended (step S1007: YES), the scheduler 121-*i* registers the selected driver at the end of the dispatch loop 131 (step S1008) and returns to step S1002.

At step S1006, if the CPU call process is to be executed (step S1006: YES), the scheduler 121-*i* goes to step S1009. The scheduler 121-*i* acquires the processing times required for the normal processes of the drivers in the dispatch loop 131, the processing time required for the CPU call process of the selected driver, and the time constraints of the drivers from the local memory 102-*i* (step S1009).

The scheduler 121-*i* calculates for each of the drivers in the dispatch loop 131, the time elapsing from the stored execution start time until the next execution start time, based on the acquired information (step S1010). The scheduler 121-*i* determines whether the constraints of the drivers can be complied with (step S1011).

If the constraints of the drivers are complied with (step S1011: YES), the scheduler 121-*i* returns to step S1007. If the time constraints of the drivers are not complied with (step S1011: NO), the scheduler 121-*i* notifies another one of the coprocessors 101 of an execution request of the driver determined as not being able to comply with the time constraint (step S1012).

The scheduler 121-*i* determines whether a response has been received (step S1013). If a response has not been received (step S1013: NO), the scheduler 121-*i* returns to step S1013. If a response has been received (step S1013: YES), the scheduler 121-*i* determines whether the response is an execution acceptance notification (step S1014).

If the response is an execution acceptance notification (step S1014: YES), the scheduler 121-*i* transmits the driver to the execution acceptance notification source, through IPC (step S1015) and returns to step S1007. If the response is not an execution acceptance notification (step S1014: NO), the scheduler 121-*i* activates the backup coprocessor 101-*j* (step S1016). The scheduler 121-*i* transmits the driver to the backup coprocessor 101-*j* through IPC (step S1017) and returns to step S1007.

FIG. 12 is a flowchart of a process procedure performed by the scheduler 121-*i* at the time of receipt of an execution request or an execution instruction. The scheduler 121-*i* determines whether an execution request or an execution instruction has been received (step S1201). If neither an execution request nor an execution instruction has been received (step S1201: NO), the scheduler 121-*i* returns to step S1201. If an execution request has been received (step S1201: EXECUTION REQUEST), the scheduler 121-*i* calculates a total of the processing time required for the normal process of the driver defined as the object of the execution request and the processing times required for the normal processes of the assigned drivers (step S1202).

The scheduler 121-*i* determines if the total is less than or equal to the time constraint of the driver defined as the object of the execution request and the time constraints of the assigned drivers, thereby determining whether the constraint is complied with (step S1203).

If the constraint is not complied with (step S1203: NO), the scheduler 121-*i* notifies the execution request notification source of the impossibility of execution (step S1204) and returns to step S1201. On the other hand, if the constraint is complied with (step S1203: YES), the scheduler 121-*i* notifies the execution request notification source of the execution acceptance (step S1205), and returns to step S1201.

If an execution instruction is received (step S1201: EXECUTION INSTRUCTION), the scheduler 121-*i* registers into the dispatch loop 131, the driver defined as the object of the execution instruction (step S1206) and returns to step S1201.

FIG. 13 is a flowchart of a process procedure at the time of acceptance of an execution request performed by the scheduler 121-*j*. The scheduler 121-*j* is executed by the backup coprocessor 101-*j*. The backup coprocessor 101-*j* has no driver assigned thereto in advance by the designer of the sensor architecture 100. The scheduler 121-*j* first determines whether an execution instruction has been received (step S1301). If no execution instruction has been received (step S1301: NO), the scheduler 121-*j* goes to step S1304.

If an execution instruction has been received (step S1301: YES), the scheduler 121-*j* registers into the dispatch loop 131, the driver defined as the object of the execution instruction (step S1302). The scheduler 121-*j* sequentially executes the drivers in the dispatch loop 131 (step S1303.)

The scheduler 121-*j* determines whether a constant time interval has elapsed (step S1304). If the constant time interval has not elapsed (step S1304: NO), the scheduler 121-*j* returns to step S1301. On the other hand, if the constant time interval has elapsed (step S1304: YES), the scheduler 121-*j* gives notification of an execution request for a driver in the dispatch loop 131 (step S1305). For example, if multiple drivers are in the dispatch loop 131, the scheduler 121-*j* may select one of the drivers, from the dispatch loop 131 and give notification of an execution request for the selected driver.

The scheduler 121-*j* determines whether execution acceptance has been received (step S1306). If execution acceptance has not been received (step S1306: NO), the scheduler 121-*j* returns to step S1304. On the other hand, if execution acceptance has been received (step S1306: YES), the scheduler 121-*j* transmits the driver to the notification source of the acceptance notification, through IPC (step S1307). For example, the scheduler 121-*j* may transmit the driver to the coprocessor 101 giving the fastest response of the execution acceptance.

The scheduler 121-*j* determines whether the dispatch loop 131 is empty (step S1308). If the dispatch loop 131 is empty (step S1308: YES), the scheduler 121-*j* causes the power supply circuit 103 to stop the power supply to the scheduler 121-*j* and stops (step S1309). On the other hand, if the dispatch loop 131 is not empty (step S1308: NO), the scheduler 121-*j* returns to step S1304.

As described above, while constraints are complied with when drivers execute normal processes, if execution of a CPU call process by one driver leads to incompliance with a constraint of another driver, the coprocessor causes another coprocessor to execute the one driver. As a result, the sensor architecture can continuously execute the drivers of sensors without exclusive control or distributed processing. Therefore, the sensor architecture can improve reliability.

The coprocessors are prepared in a number sufficient to comply with the constraints of all the sensors in the case of the maximum load. The drivers at the start of operation are disposed in the minimum number of the coprocessors capable of complying with the constraints of all the sensors, the minimum number of the coprocessors being based on the minimum load of execution of the drivers assumed by the designer of the sensor architecture. A coprocessor to which no driver has been assigned is kept stopped as a backup coprocessor. As a result, the detection apparatus can stop a surplus coprocessor and thereby, reduce power consumption.

If the constraints of all the drivers cannot be complied with by only the activated coprocessors, the coprocessor activates and causes a backup processor to execute a driver. As a result, the constraints of all the drivers can be complied with. This enables the sensor architecture to continuously execute the drivers of sensors. Therefore, the sensor architecture can improve reliability.

If a coprocessor has a surplus of capacity, the backup coprocessor causes the coprocessor to execute the assigned driver and stops. As a result, power consumption can be reduced.

The notification method described in the present embodiment may be implemented by executing a prepared program on a computer such as a personal computer and a workstation. The program is stored on a non-transitory, computer-readable recording medium such as a hard disk, a flexible disk, a CD-ROM, an MO, and a DVD, read out from the computer-readable medium, and executed by the computer. The program may be distributed through a network such as the Internet.

According to one aspect of the embodiments, the execution of a driver can be continued even without exclusive control and load distribution.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A detection apparatus comprising:

a plurality of processors among which a first processor repeatedly executes in sequence respective drivers corresponding to a plurality of sensors;

a memory unit configured to enable access by the first processor and to store a processing time required for a first process corresponding to the respective drivers, a processing time required for a second process corresponding to the respective drivers, and a time constraint corresponding to the respective drivers, wherein:

the first processor stores in the memory unit, an execution start time corresponding to the respective drivers, when execution of the respective drivers is switched, the first processor, when a driver under execution among the respective drivers executes the second process, adds to a difference of an execution start time stored in the memory unit and corresponding to a remaining driver among the respective drivers excluding the driver under execution and a start time when the driver under execution executes the second process, the processing time required for the second process of the driver under execution and the processing time required for the first process of the remaining driver, the first processor adding to the difference, based on an execution sequence of the respective drivers, the first processor determines whether a time calculated for the remaining driver complies with a time constraint stored in the memory unit and corresponding to the remaining driver, and the first processor notifies a second processor of an execution request for a driver determined as not complying with the time constraint, the second processor being among the plurality of processors.

2. The detection apparatus according to claim 1, wherein the second processor stops when the second processor has no assigned process corresponding to any of the plurality of sensors.

3. The detection apparatus according to claim 2, wherein if no processor activated among the plurality of processors is able to execute the driver determined as not complying with the time constraint, the first processor activates the second processor and after activation, notifies the second processor of an execution instruction for the driver determined as not complying with the time constraint.

4. The detection apparatus according to claim 3, wherein the second processor, after accepting the execution request and during execution of the driver indicated by the execution request, requests the first processor to execute the driver, and the second processor stops when the first processor accepts to execute the driver.

5. A notification method performed by a first processor that is among the plurality of processors and that repeatedly executes in sequence, respective drivers corresponding to a plurality of sensors, the notification method comprising:

storing in a memory unit, an execution start time corresponding to the respective drivers when execution of the respective drivers is switched, the memory unit being configured to enable access by the first processor and to store a processing time required for a first process corresponding to the respective drivers, a processing time required for a second process corresponding to the respective drivers, and a time constraint corresponding to the respective drivers;

when a driver under execution among the respective drivers executes the second process, adding to a difference of an execution start time stored in the memory unit and corresponding to a remaining driver among the respective drivers excluding the driver under execution and a start time when the driver under execution executes the second process, the processing time required for the second process of the driver under execution and the processing time required for the first process of the remaining driver, the adding being based on an execution sequence of the respective drivers, determining whether a time calculated for the remaining driver complies with a time constraint stored in the memory unit and corresponding to the remaining driver, and notifying a second processor of an execution request for a driver determined as not complying with the time constraint, the second processor being among the plurality of processors.

6. A non-transitory, computer-readable recording medium storing a notification program causing a first processor that is among a plurality of processors and repeatedly executes in sequence respective drivers corresponding to a plurality of sensors, to execute a process comprising:

storing in a memory unit, an execution start time corresponding to the respective drivers when execution of the respective drivers is switched, the memory unit being configured to enable access by the first and to store a processing time required for a first process corresponding to the respective drivers, a processing time required for a second process corresponding to the respective drivers, and a time constraint corresponding to the respective drivers;

when a driver under execution among the respective drivers executes the second process, adding to a difference of an execution start time stored in the memory unit and corresponding to a remaining driver among the respective drivers excluding the driver under execution and a start time when the driver under execution executes the second process, the processing time required for the second process of the driver under execution and the processing time required for the first process of the remaining driver, the adding being based on an execution sequence of the respective drivers, determining whether a time calculated for the remaining driver complies with a time constraint stored in the memory unit and corresponding to the remaining driver, and notifying a second processor of an execution request for a driver determined as not complying with the time constraint, the second processor being among the plurality of processors.

* * * * *